(12) United States Patent
Tanaka et al.

(10) Patent No.: US 11,711,604 B2
(45) Date of Patent: Jul. 25, 2023

(54) CAMERA MODULE ARRAY AND ASSEMBLY METHOD THEREFOR

(71) Applicant: NINGBO SUNNY OPOTECH CO., LTD., Zhejiang (CN)

(72) Inventors: Takehiko Tanaka, Ningbo (CN); Yinli Fang, Ningbo (CN)

(73) Assignee: NINGBO SUNNY OPOTECH CO., LTD., Zhejiang (CN)

(*) Notice: Subject to any disclaimer, the term of this patent is extended or adjusted under 35 U.S.C. 154(b) by 0 days.

(21) Appl. No.: 17/702,384

(22) Filed: Mar. 23, 2022

(65) Prior Publication Data

US 2022/0217254 A1  Jul. 7, 2022

Related U.S. Application Data

(62) Division of application No. 17/057,606, filed as application No. PCT/CN2019/084451 on Apr. 26, 2019, now Pat. No. 11,350,020.

(30) Foreign Application Priority Data

May 30, 2018 (CN) .......................... 201810541268.4
May 30, 2018 (CN) .......................... 201820824061.3

(51) Int. Cl.
*H04N 23/55* (2023.01)
*G02B 13/02* (2006.01)
(Continued)

(52) U.S. Cl.
CPC ............. *H04N 23/55* (2023.01); *G02B 13/02* (2013.01); *G02B 13/06* (2013.01);
(Continued)

(58) Field of Classification Search
CPC .. H04N 5/2254; H04N 5/2258; H04N 17/002; G02B 13/02; G02B 13/06; G02B 27/0012; H04M 1/0264; H04M 1/0277
See application file for complete search history.

(56) References Cited

U.S. PATENT DOCUMENTS 10,139,585 B1 * 11/2018 Chou ................... H04N 5/2252
2008/0218612 A1   9/2008 Border et al.
(Continued)

FOREIGN PATENT DOCUMENTS

CN    101637019 A    1/2010
CN    102866484 A    1/2013
(Continued)

OTHER PUBLICATIONS

Extended European Search Report for European Application No. 19810190.9, dated May 14, 2021.
(Continued)

*Primary Examiner* — Mekonnen D Dagnew
(74) *Attorney, Agent, or Firm* — Birch, Stewart, Kolasch & Birch, LLP

(57) ABSTRACT

The present application provides a camera module array, comprising at least two camera modules, wherein at least one of the camera modules has a free-form lens sheet, and the free-form lens sheet performs active alignment according to an actual imaging result received by a photosensitive chip, so that a difference between an actual reference direction of the free-form lens sheet and a reference direction determined by an optical design is not greater than 0.05 degrees. The present application further provides a corresponding assembly method for camera module array. In the present application, a TTL of the camera modules can be reduced by means of the free-form lens sheet so as to, for example, make a TTL of a wide-angle module equal or approximately equal to a TTL of a telephoto module, so that (Continued)

a dual-camera module composed of the wide-angle module and the telephoto module is easily mounted in a terminal device such as a mobile phone. The present application can also effectively improve the mounting precision of the free-form lens sheet.

19 Claims, 9 Drawing Sheets

(51) Int. Cl.
  *G02B 13/06* (2006.01)
  *G02B 27/00* (2006.01)
  *H04M 1/02* (2006.01)
  *H04N 23/45* (2023.01)

(52) U.S. Cl.
  CPC ...... *G02B 27/0012* (2013.01); *H04M 1/0264* (2013.01); *H04M 1/0277* (2013.01); *H04N 23/45* (2023.01)

(56) References Cited

U.S. PATENT DOCUMENTS

| | | |
|---|---|---|
| 2010/0165134 A1 | 7/2010 | Dowski, Jr. et al. |
| 2013/0308212 A1 | 11/2013 | Kubala et al. |
| 2014/0247505 A1* | 9/2014 | Huang ........... G02B 15/144113 359/686 |
| 2015/0054104 A1 | 2/2015 | Black |
| 2016/0282580 A1 | 9/2016 | Koyama et al. |
| 2017/0353645 A1 | 12/2017 | Shabtay et al. |
| 2018/0143402 A1 | 5/2018 | Lin et al. |
| 2018/0152624 A1* | 5/2018 | Li .......................... H04N 5/265 |
| 2018/0167540 A1 | 6/2018 | Liu et al. |

FOREIGN PATENT DOCUMENTS

| | | |
|---|---|---|
| CN | 203909388 U | 10/2014 |
| CN | 106790792 A | 5/2017 |
| CN | 208572216 U | 3/2019 |
| WO | WO 2017/025822 A1 | 2/2017 |
| WO | WO 2018/076460 A1 | 5/2018 |

OTHER PUBLICATIONS

International Search Report for PCT/CN2019/084451 (PCT/ISA/210) dated Jul. 15, 2019.

* cited by examiner

CAMERA MODULE ARRAY AND ASSEMBLY METHOD THEREFOR

CROSS REFERENCE TO RELATED APPLICATIONS

This application is a Divisional of copending Application No. U.S. Ser. No. 17/057,606, filed on Nov. 20, 2020, which is the National Phase under 35 U.S.C. § 371 of International Application No. PCT/CN2019/084451, filed on Apr. 26, 2019, claiming the benefit under under 35 U.S.C. § 119(a) to Chinese invention patent application No. 201810541268.4, entitled "CAMERA MODULE ARRAY AND ASSEMBLY METHOD THEREFOR", filed with the Chinese Patent Office on May 30, 2018, and Chinese utility model patent application No. 201820824061.3, entitled "CAMERA MODULE ARRAY", filed with the Chinese Patent Office on May 30, 2018, the entire contents of which are incorporated herein by reference.

TECHNICAL FIELD

The present application relates to the technical field of optical imaging. Specifically, the present application relates to a camera module array and an assembly method therefor.

BACKGROUND

With the popularity of mobile electronic devices, the related technologies of camera modules for helping users obtain images (such as videos or images) applied in the mobile electronic devices have been developed and advanced rapidly, and in recent years, the camera modules have been widely applied in many fields such as medical treatment, security and industrial production.

In order to meet the increasingly widespread market demands, high pixels, small size and large aperture are irreversible development trends of the existing camera modules. A large aperture lens can bring a large field of view. However, this also causes the problem of a longer total optical length and greater distortion of the field of view of the lens. For example, a mobile phone lens with a 130° field of view has distortion greater than 10%. In the field of small-size optical apparatuses, the above-mentioned problems will become more prominent and difficult to solve.

On the other hand, multi-camera modules are increasingly applied to smart terminal devices such as mobile phones. In the dual cameras in the prior art, a structure of a telephoto lens and a wide-angle lens is often adopted to form the dual camera, so as to bring the users a better camera experience. For example, a telephoto lens can be used as a main camera to take photos, and a wide-angle lens has a larger field of view, and can be used to assist in calculating depth information of the photos for subsequent image blurring processing.

In the dual cameras composed of wide-angle and telephoto lenses in the prior art, the telephoto lens and the wide-angle lens often have inconsistent total track lengths (abbreviated as TTL), and sometimes TTL may also be referred to as total optical length. The TTL here refers to a height measured from an end surface of the lens barrel to an imaging surface in the mechanism. The total optical length of the telephoto lens camera module is often greater than that of the wide-angle lens camera module. On the other hand, when the dual camera module is assembled, a certain base line distance needs to be maintained between the two camera modules. The base line distance refers to a distance between two optical centers of the lenses in the stereo vision system. The above requirements may cause difficulties in mounting such a dual-camera module composed of wide-angle and telephoto lenses in a compact mobile phone space. For example, the end surfaces of wide-angle and telephoto lenses are not flush, resulting in the need to use an additional support for fixing. For example, two modules are fixed in two accommodating holes of the support, respectively, and it is ensured by the support that the optical centers of the two camera modules are located in the same horizontal line and the base line distance is stable.

Moreover, in recent years, the free-form technology has become more mature, and free-form lens sheets can be obtained by using the free-form technology. Based on the free-form technology, a progressive multi-focal surface can be processed on a front or back surface of a lens sheet through free-form design software during optical design, and then a complex surface can be processed by, for example, a lathe. At present, the free-form technology has been widely used in the high-end spectacle lens sheet industry. If the free-form lens sheet is used in the field of small-size optical devices (such as the field of mobile phone camera modules), it will help reduce the distortion of the large field of view, and reduce the total optical length of the camera module to a certain extent. Taking the above-mentioned 130° field of view mobile phone lens as an example, with the free-form lens sheet, it is expected that the distortion can be reduced to less than 2%. If the free-form lens sheet is used in an ordinary auto focus module, the total optical length can be reduced by about 10%, the MTF design value can be increased by 8%, and the distortion can be reduced to less than 1%. In other words, the free-form lens sheet can reduce or minimize the aberration of the optical system, realize the function of correcting aberrations and reducing distortion, and can also achieve the effect of reducing the overall optical length and/or volume of the module.

However, a free-form surface is a complex aspheric surface, is irregular and asymmetric in most cases, and has multiple symmetry axes. Moreover, in the field of small-size optical apparatuses (such as the field of mobile phone camera modules), typical optical lenses on the market are assembled by means of embedding them piece by piece. Specifically, a lens barrel with a stepped bearing surface on an inner side is prepared in advance, and then lens sheets are embedded into the stepped bearing surface on the inner side of the lens barrel one by one to obtain a complete optical lens. Due to the limitations of the mounting process, the lens sheet surface profile selected in the lens barrel is usually a spherical or aspherical surface with rotational symmetry. If a free-form lens sheet is used, it cannot be accurately mounted by the traditional assembly process for the compact camera module lens. Because in an optical system with the free-form lens sheet, the non-rotationally symmetric free-form lens sheet has no single optical axis to make it symmetrical, it is difficult to find an optical center and the optical axis alignment and correction problems cannot be controlled. The lens sheet surface profile size of the camera module is often less than 0.7 cm. In the mounting of small-size lens sheets, higher mounting requirements are required, and faster mounting capabilities are also required. The above problems all make it difficult to apply free-form lens sheets to compact camera modules.

SUMMARY

The present application is intended to provide a solution that can overcome at least one shortcoming of the prior art.

According to an aspect of the present application, there is provided a camera module array, comprising at least two camera modules, wherein at least one of the camera modules has a free-form lens sheet, and the free-form lens sheet performs active alignment according to an actual imaging result received by a photosensitive chip, so that a difference between an actual reference direction of the free-form lens sheet and a reference direction determined by an optical design is not greater than 0.05 degrees.

In an embodiment, the free-form lens sheet is mounted in an optical alignment lens, and the optical alignment lens comprises: a first lens component comprising at least one first lens sheet; a second lens component comprising a second lens barrel and at least one second lens sheet mounted in the second lens barrel, the at least one first lens sheet and the at least one second lens sheet together constituting an imageable optical system; and a connecting medium adapted to fix the first lens component and the second lens component together; and at least one of the at least one first lens sheet and the at least one second lens sheet has at least one free-form lens sheet.

In an embodiment, the at least two camera modules comprise a wide-angle module and a telephoto module, and the telephoto module has the optical alignment lens; and total track lengths of the wide-angle module and the telephoto module are equal or a difference between the total track lengths of the two is smaller than a preset threshold.

In an embodiment, the wide-angle module has the optical alignment lens, and in the wide-angle module, at least one of the at least one first lens sheet and the at least one second lens sheet has at least one free-form lens sheet.

In an embodiment, the wide-angle module and the telephoto module share the same circuit board.

In an embodiment, the at least two camera modules comprise a black and white module and a color module.

In an embodiment, the free-form lens sheet has a plurality of functional regions, and the plurality of functional regions have different curvatures.

In an embodiment, the wide-angle camera module has at least one free-form lens sheet to reduce photographing distortion of the wide-angle camera module.

In an embodiment, the connecting medium is an adhesive, which is adapted to support and fix the first lens component and the second lens component, and make a relative position of the first lens component and the second lens component maintain at a relative position determined by active alignment.

In an embodiment, there is a non-zero included angle between an axis of the first lens component and an axis of the second lens component; and in an optical axis direction of the optical lens, there is a gap between the first lens component and the second lens component.

In an embodiment, the number of the first lens sheet is one, and the first lens sheet is a free-form lens sheet.

In an embodiment, the number of the at least one second lens sheet is more than one, and the at least one second lens sheet has one free-form lens sheet.

In an embodiment, the at least one first lens sheet has one free-form lens sheet, and the at least one second lens sheet has one free-form lens sheet.

In an embodiment, the first lens component further comprises a first lens barrel, and the at least one first lens sheet is mounted on an inner side of the first lens barrel.

In an embodiment, the first lens component and/or the second lens component have/has an identification characterizing surface profile direction information of the free-form lens sheet included therein.

In an embodiment, the free-form lens sheet has a reference plane perpendicular to its thickness direction, the free-form lens sheet has a reference direction in the reference plane, and the first lens component and/or the second lens component have/has an identification of the reference direction to characterize the surface profile direction information of the free-form lens sheet.

In an embodiment, the connecting medium is an adhesive, which is adapted to support and fix the first lens component and the second lens component, and make the difference between the actual reference direction of the free-form lens sheet and the reference direction determined by the optical design is not greater than 0.05 degrees.

In an embodiment, the at least two camera modules comprise two asymmetric camera modules, and at least one of the two asymmetric camera modules has a free-form lens sheet, so that total track lengths of the two asymmetric camera modules are equal or a difference between the total track lengths of the two is smaller than a preset threshold.

In an embodiment, frontal end surfaces of the two asymmetric camera modules are flush with each other.

According to another aspect of the present application, there is further provided an assembly method for camera module array, comprising: assembling a wide-angle lens and a telephoto lens; and mounting the wide-angle lens and the telephoto lens on the same circuit board; wherein the telephoto lens is an optical alignment lens, and the optical alignment lens comprises a first lens component and a second lens component, and wherein the first lens component comprises at least one first lens sheet, the second lens component comprises a second lens barrel and at least one second lens sheet mounted in the second lens barrel, and at least one of the at least one first lens sheet and the at least one second lens sheet has at least one free-form lens sheet, a method of assembling the optical alignment lens comprising: pre-positioning the first lens component and the second lens component separated from each other, so that the at least one first lens sheet and the at least one second lens sheet together constitute an imageable optical system; adjusting and determining a relative position of the first lens component and the second lens component based on active alignment; and bonding the first lens component and the second lens component by an adhesive, so that the first lens component and the second lens component are fixed and maintained at a relative position determined by the active alignment.

In an embodiment, the step of mounting the wide-angle lens and the telephoto lens on the same circuit board comprises: directly bonding the wide-angle lens and the telephoto lens to a surface of the circuit board.

In an embodiment, the step of mounting the wide-angle lens and the telephoto lens on the same circuit board comprises: mounting two photosensitive chips that correspond to the wide-angle lens and the telephoto lens, respectively, on a surface of the circuit board; mounting or forming a lens holder surrounding the two photosensitive chips on the surface of the circuit board; and directly bonding the wide-angle lens and the telephoto lens to a top surface of the lens holder.

In an embodiment, the at least one first lens sheet has at least one free-form lens sheet, and the at least one second lens sheet has at least one free-form lens sheet.

In an embodiment, the active alignment comprises: according to a measured resolution of the optical system, adjusting and determining a relative positional relationship of the first lens component and the second lens component by clamping or adsorbing the first lens component and/or the second lens component.

In an embodiment, the active alignment further comprises: adjusting a relative positional relationship of the first lens component and the second lens component, so that a difference between an actual reference direction of the free-form lens sheet and a reference direction determined by an optical design is not greater than 0.05 degrees, wherein the reference direction is used to characterize surface profile direction information of the free-form lens sheet.

In an embodiment, the active alignment further comprises: moving the first lens component along an adjustment plane, and according to a measured resolution of the optical system, determining a relative position between the first lens component and the second lens component in a direction of movement along the plane, wherein the movement comprises rotation in the adjustment plane.

In an embodiment, in the active alignment step, the movement further comprises translation in the adjustment plane.

In an embodiment, the active alignment further comprises: according to a measured resolution of the optical system, adjusting and determining an included angle between an axis of the lens component and an axis of the second lens component.

In an embodiment, the active alignment further comprises: moving the first lens component along a direction perpendicular to the adjustment plane, and according to a measured resolution of the optical system, determining a relative position between the first lens component and the second lens component in the direction perpendicular to the adjustment plane.

In an embodiment, the first lens component further comprises a first lens barrel, and the at least one first lens sheet is mounted on an inner side of the first lens barrel.

In an embodiment, in the pre-positioning step, there is a gap between a bottom surface of the first lens component and a top surface of the second lens component; and in the bonding step, the adhesive is arranged in the gap.

According to another aspect of the present application, there is further provided another assembly method for camera module array, comprising: assembling a wide-angle module and a telephoto module; and fixing the wide-angle module and the telephoto module together to form a camera module array, so that an included angle between the wide-angle module and the telephoto module is within an included angle threshold, and a distance between the wide-angle module and the telephoto module is within a distance threshold; wherein at least one of the telephoto module and the wide-angle module has a free-form lens sheet.

In an embodiment, the telephoto module comprises a telephoto lens and a corresponding photosensitive chip, and the telephoto lens has a free-form lens sheet; and in the step of assembling the telephoto module, according to an actual imaging result output by the photosensitive chip, a relative position of the telephoto lens and the photosensitive chip is determined by active alignment, so that a difference between an actual reference direction of the free-form lens sheet and a reference direction determined by an optical design is not greater than 0.05 degrees, wherein the reference direction is used to characterize surface profile direction information of the free-form lens sheet.

According to another aspect of the present application, there is further provided an assembly method for camera module array, comprising: assembling at least two camera modules, at least one of which has a free-form lens sheet; and fixing the at least two camera modules together to form a camera module array, so that an included angle between any two camera modules of the at least two camera modules is within a threshold, and a distance between the two camera modules is within a threshold; wherein in the step of assembling the at least two camera modules, the camera module including the free-form lens sheet comprises an optical lens including the free-form lens sheet and a corresponding photosensitive chip, and assembling the camera module including the free-form lens sheet comprises: according to an actual imaging result output by the photosensitive chip, determining a relative position of the optical lens including the free-form lens sheet and the photosensitive chip by active alignment, so that a difference between an actual reference direction of the free-form lens sheet and a reference direction determined by an optical design is not greater than 0.05 degrees, wherein the reference direction is used to characterize surface profile direction information of the free-form lens sheet.

Compared with the prior art, the present application has at least one of the following technical effects:

1 In the present application, the TTL of the telephoto module can be reduced through the free-form lens sheet, so that the TTL of the wide-angle module is equal or approximately equal to that of the telephoto module, and thus the dual-camera module composed of wide-angle and telephoto modules can be easily mounted in terminal devices such as mobile phones.

2. In some embodiments of the present application, the wide-angle module and the telephoto module can be fabricated on the same substrate, and it is ensured by the substrate that the optical centers of the two camera modules are in the same horizontal line and the base line distance is kept stable.

3. In some embodiments of the present application, the support with two accommodating holes can be eliminated, which is helpful to save costs and reduce process steps.

4. In some embodiments of the present application, the free-form lens sheet can be used to provide a plurality of functional sub-regions. For example, the telephoto lens can be caused to clearly image a plurality of different depth-of-field regions, thereby providing a better camera experience for dual-camera or multi-camera module users.

5. In some embodiments of the present application, product defects caused by undesired rotation of the free-form lens sheet or inaccurate positioning of the rotation direction in the lens barrel during assembly can be effectively avoided. The free-form lens sheet is highly sensitive to assembly errors, especially rotation errors. If an optical lens or camera module including the free-form lens sheet is assembled based on the traditional technology, the free-form lens sheet is prone to undesired rotation or inaccurate positioning in the rotation direction in the lens barrel, resulting in the problems such as substandard product imaging quality or even failure of imaging. However, the present application can effectively solve the above-mentioned problems.

6. In some embodiments of the present application, the mounting accuracy of the free-form lens sheet can be effectively improved in the field of small-size optical apparatuses, thereby improving the imaging quality of optical lenses or camera modules.

7 In some embodiments of the present application, the production efficiency of optical lenses or camera modules including the free-form lens sheet can be effectively improved and the product yield can be improved, which is suitable for mass production.

8. In some embodiments of the application, the height of the module can be effectively reduced, which is helpful to reduce the overall size of the camera module array.

BRIEF DESCRIPTION OF THE DRAWINGS

The exemplary embodiments are shown in the reference drawings. The embodiments and drawings disclosed herein are to be considered illustrative and not restrictive.

DETAILED DESCRIPTION

Figure 1:
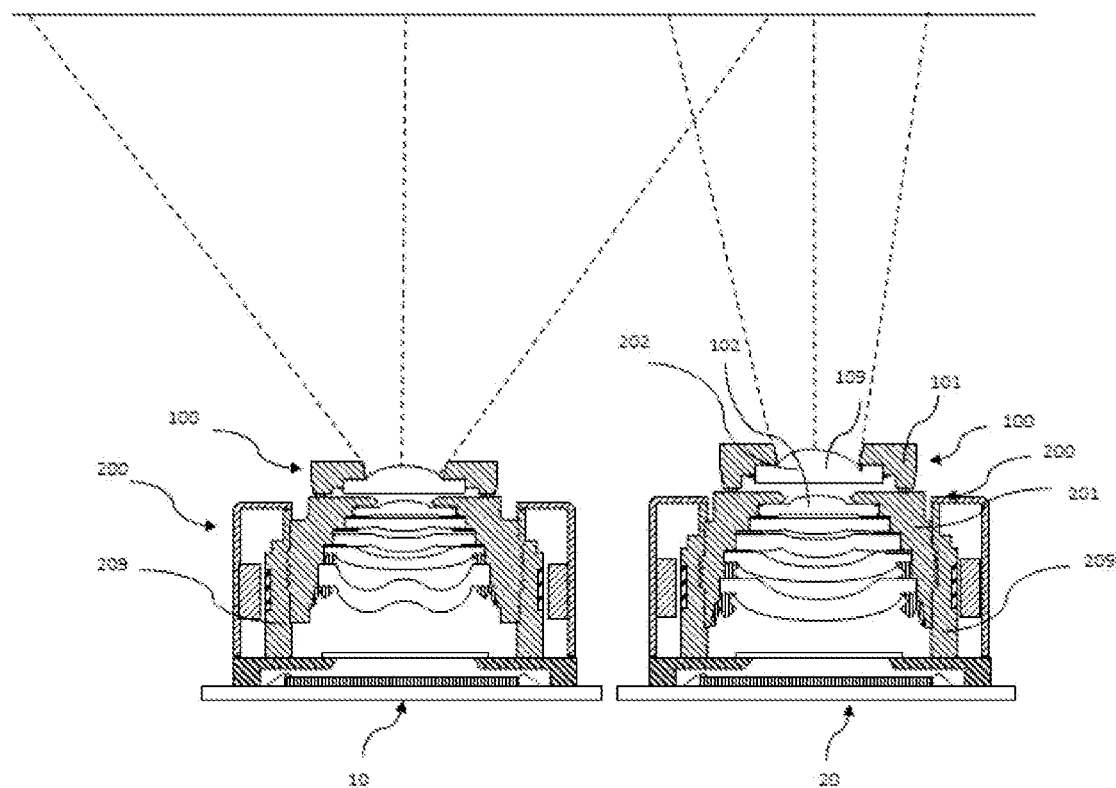
FIG. 1 shows a camera module array according to an embodiment of the present application.

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire list of listed features, rather than the individual elements in the list. In addition, when describing the implementations of the present application, the use of "may" means "one or more implementations of the present application", and, the term "exemplary" refers to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

FIG. 1 shows a camera module array according to an embodiment of the present application. As shown in FIG. 1, the camera module array is a dual-camera module, including a wide-angle module 10 (sometimes referred to as a wide-angle lens module herein) and a telephoto module 20 (sometimes referred to as a telephoto lens module herein). In this embodiment, the telephoto module 20 has an optical alignment lens 1000, and the optical alignment lens 1000 has at least one free-form lens sheet 109, so as to reduce the total track length (TTL) of the telephoto module 20, so that the total track lengths of the wide-angle module 10 and the telephoto module 20 are equal or a difference between the two is smaller than a preset threshold. The optical alignment lens 1000 includes a first lens component 100, a second lens component 200 and a connecting medium. The first lens component 100 includes a first lens barrel 101 and at least one first lens sheet 102 mounted inside the first lens barrel 101 (in this embodiment, the number of the first lens sheet 102 is one). The second lens component 200 includes a second lens barrel 201 and at least one second lens sheet 202 mounted in the second lens barrel 201 (in this embodiment, the number of the second lens sheets 102 is five). The at least one first lens sheet 102 and the at least one second lens sheet 202 together constitute an imageable optical system. The connecting medium is adapted to fix the first lens component 100 and the second lens component 200 together. Moreover, in the telephoto module 20, at least one of the at least one first lens sheet 102 and the at least one second lens sheet 202 has at least one free-form lens sheet 109. In this embodiment, the second lens barrel 201 is mounted in a carrier of a motor. Hereinafter, an optical alignment lens 1000 with the free-form lens sheet 109 will be further introduced in conjunction with other embodiments.

Referring to FIG. 1, photographing regions of the wide-angle module 10 and the telephoto module 20 have overlap. In the embodiment shown in FIG. 1, the TTL of the telephoto module 20 can be reduced through the free-form lens sheet 109, so that the TTL of the wide-angle module 10 is equal or approximately equal to that of the telephoto module 20, and thus the dual-camera module composed of wide-angle and telephoto modules can be easily mounted in terminal devices such as mobile phones. For example, in this embodiment, photosensitive centers of the two camera modules (such as the wide-angle module 10 and the telephoto module 20) can be at the same height (referring to the height in the normal direction of the surface of the circuit board 301), and at the same time, heights of light incident surfaces of the two camera modules can substantially be the same (or it can be understood that frontal end surface faces of the wide-angle lens and the telephoto lens are substantially in the same horizontal plane), so that the images taken by the wide-angle lens and the telephoto lens are more consistent, which is more convenient for post-processing and reduces distortion.

Based on the above-mentioned embodiment, the dual cameras are used for photographing. After a main subject (such as a person and an object) is deeply identified, the images obtained by telephoto and wide-angle lenses can be processed to obtain various specialized images with the effects such as background blur, detail enlargement and resolution enhancement. After the free-form lens sheet 109 is used, when the telephoto lens module and the wide-angle lens module are used for photographing, the details of the photographed subject in the image have high consistency. Therefore, it can be better than the prior art in the effects of detail supplementation and pixel filling.

Figure 6:
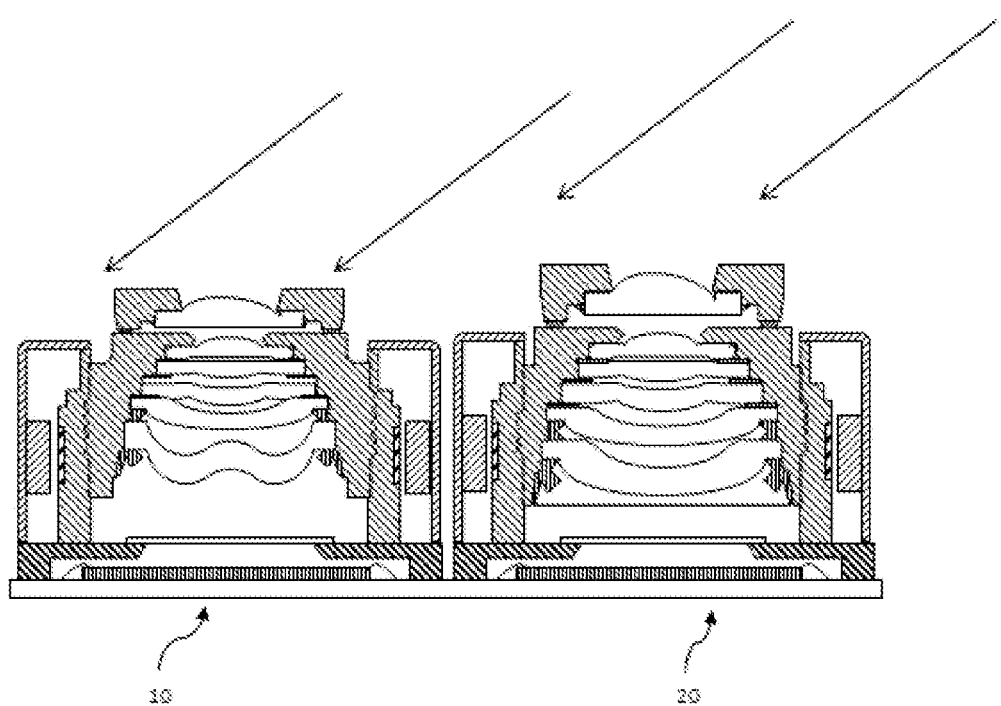
FIG. 6 shows a camera module array of a comparative example.

Further, the frontal end surfaces of the wide-angle and telephoto lenses are located in the same horizontal plane (or the heights of the light incident surfaces are substantially the same), which can also prevent the telephoto lens module from blocking the wide-angle lens module from receiving part of the light. Therefore, the shadow and light-shielding effect of the wide-angle lens module can be avoided. FIG. 6 shows a camera module array of a comparative example. As shown in FIG. 6, the telephoto module 20 in this comparative example is significantly higher than the wide-angle module 10, so that a part of the light may not be received by the wide-angle module 20 due to the shielding of the telephoto module 20.

Figure 2A:
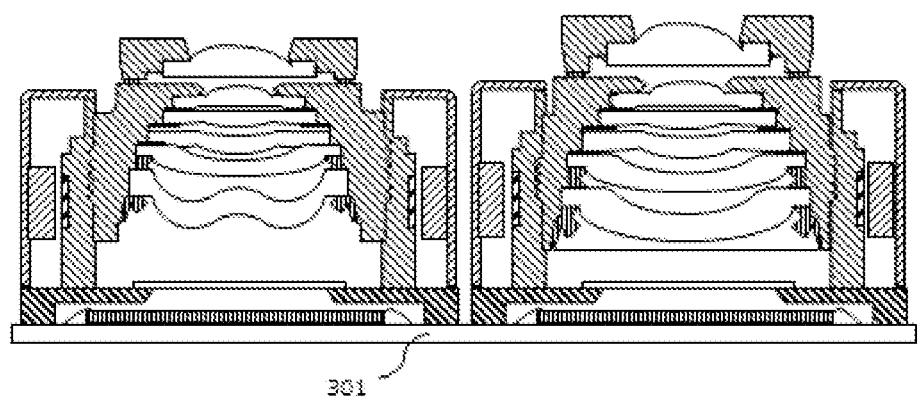
FIG. 2A shows a camera module array according to another embodiment of the present application.

FIG. 2A shows a camera module array according to another embodiment of the present application. In this embodiment, the wide-angle module 10 and the telephoto module 20 share the same circuit board 301. Specifically, two photosensitive chips that correspond to the wide-angle lens and the telephoto lens, respectively, can be mounted on a surface of the same circuit board 301; a lens holder surrounding the two photosensitive chips is mounted or formed on the surface of the circuit board 301; and the wide-angle lens and the telephoto lens are directly bonded on a top surface of the lens holder. The wide-angle module 10 and the telephoto module 20 are fabricated on the same circuit board 301 (or a substrate, for example, the substrate can be a combination of the circuit board 301 and the lens holder), and it can be ensured by the circuit board 301 (or the substrate) that the optical centers of the two camera modules are located in the same horizontal line, and the base line distance is kept stable. Thus, the support with two accommodating holes can be eliminated, which is helpful to save costs and reduce process steps.

Figure 2B:
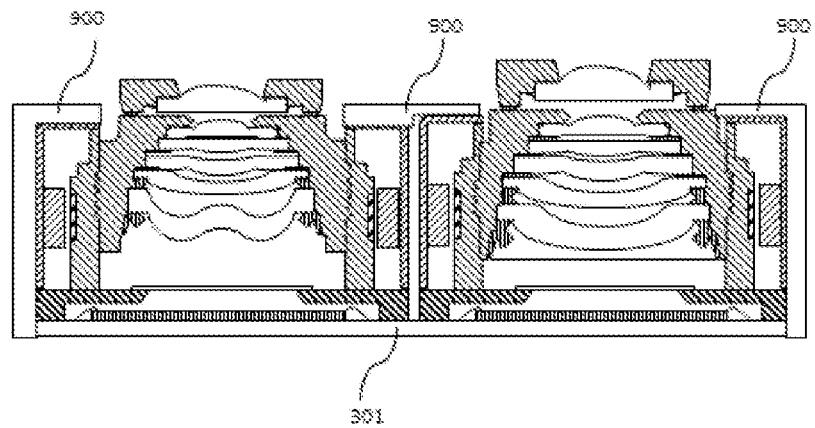
FIG. 2B shows a camera module array according to a modified embodiment of the present application.

FIG. 2B shows a camera module array according to a modified embodiment of the present application. In this embodiment, a support 900 is added on the basis of the embodiment shown in FIG. 2A. It should be noted that the support 900 only plays a role of reinforcement, and the two camera modules mainly use the common circuit board 301 (or the substrate) to ensure that the optical centers of the two camera modules are located in the same horizontal line and the base line distance is kept stable.

It should be noted that in another modified embodiment, the lens holder in FIG. 2 can be eliminated, and the wide-angle lens and the telephoto lens can be directly bonded on the surface of the circuit board 301. In another modified embodiment, the two lens holders in FIG. 2 can be replaced by an integrally-formed molded lens holder. The molded lens holder can be connected into one body, thereby improving the structural strength and better ensuring that the optical centers of the two camera modules are located in the same horizontal line and the base line distance is kept stable.

Figure 3A:
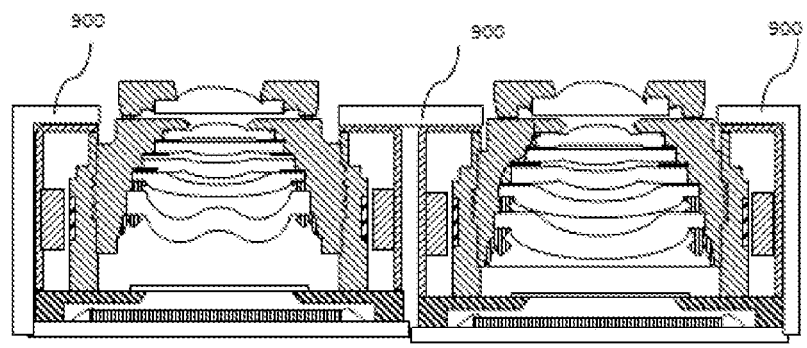
FIG. 3A shows a camera module array according to another embodiment.

Further, FIG. 3A shows a camera module array in another embodiment. In this embodiment, the wide-angle module 10 and the telephoto module 20 do not share the same circuit board 301. The wide-angle module 10 and the telephoto module 20 are fixed by a support 900, and the heights of light incident surfaces of the two camera modules are the same (or it can be understood that the frontal end surfaces of the wide-angle and telephoto lenses are located in the same horizontal plane, that is, the frontal end surfaces of the wide-angle and telephoto lenses are flush with each other).

Figure 3B:
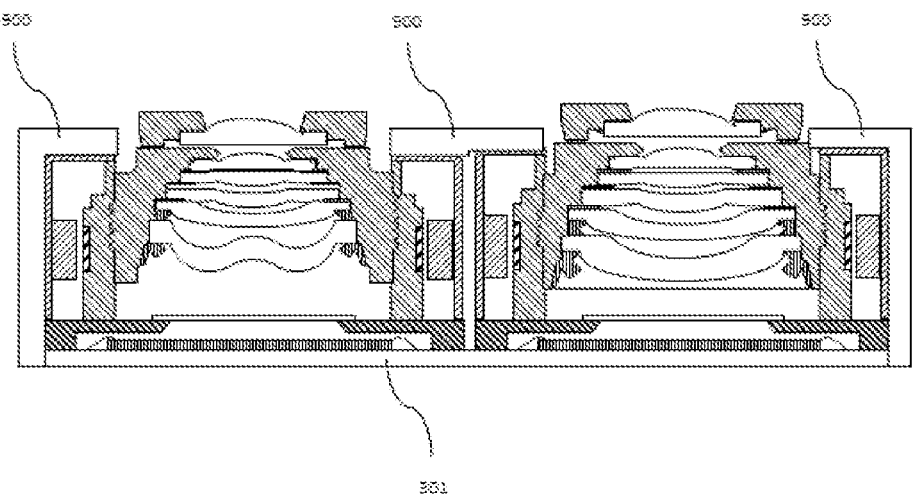
FIG. 3B shows a camera module array according to another embodiment.

Further, FIG. 3B shows a camera module array in another embodiment. In this embodiment, the TTL of the telephoto module 20 is reduced by a free-form lens sheet, so that the TTL of the wide-angle module 10 is equal or approximately equal to that of the telephoto module 20. The wide-angle module 10 and the telephoto module 20 share the same circuit board 301. Photosensitive centers (centers of photosensitive elements) of the two camera modules are at the same height (referring to the height in the normal direction of the surface of the circuit board 301), and at the same time, the heights of light incident surfaces of the two camera modules are substantially the same (or it can be understood that frontal end surface faces of the wide-angle lens and the telephoto lens are substantially in the same horizontal plane), so that the images taken by the wide-angle and the telephoto lenses are more consistent, which is more convenient for post-processing and reduces distortion. On the other hand, the camera module array is reinforced by the support 900, so that the wide-angle module 10 and the telephoto module 20 are more stably fixed together.

Figure 4:
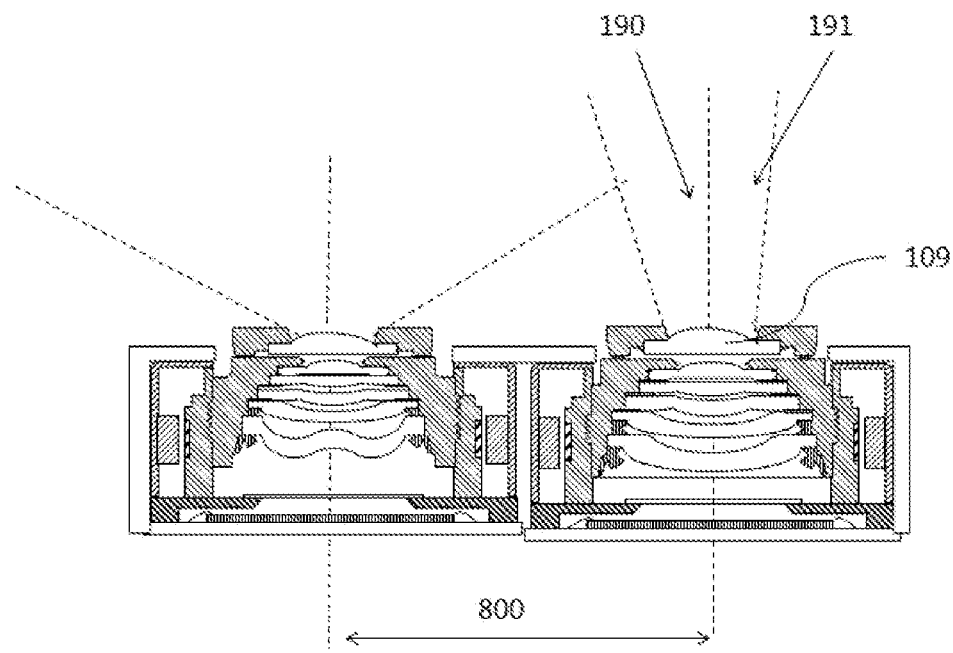
FIG. 4 shows a camera module array in another embodiment of the present application.
Figure 5:
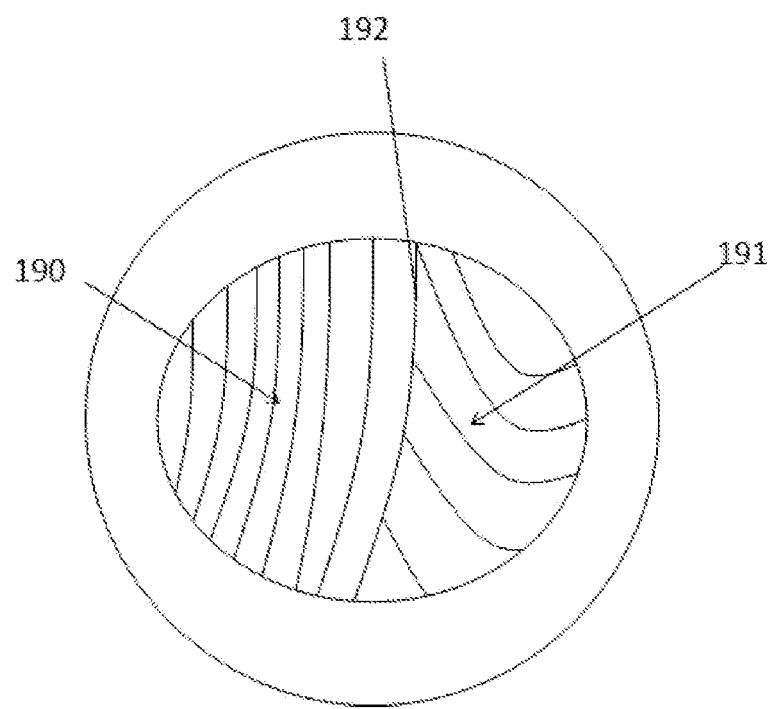
FIG. 5 shows a schematic top view of a free-form lens sheet in the embodiment of FIG. 4.

Further, FIG. 4 shows a camera module array in another embodiment of the present application. In the telephoto module 20 of this embodiment, the free-form lens sheet 109 has a first optically functional sub-region 190 and a second optically functional sub-region 191. FIG. 5 shows a schematic top view of the free-form lens sheet in the embodiment of FIG. 4. Referring to FIG. 5, the first optically functional sub-region 190 and the second optically functional sub-region 191 may have different surface profiles (curvatures), so as to obtain different functions. Also shown in FIG. 5 is a boundary line between the first optically functional sub-region 190 and the second optically functional sub-region 191, namely, a region boundary line 192. For example, the first optically functional sub-region 190 and the second optically functional sub-region 191 may correspond to different depth-of-field intervals, so that the telephoto module 20 can obtain clear images of objects in different depth-of-field intervals at the same time. Comprehensive processing is performed in conjunction with the imaging of the wide-angle module 10, which can provide a better camera experience for dual-camera or multi-camera module users. For example, the images obtained by telephoto and wide-angle lenses can be processed to obtain various specialized images with the effects such as background blur, detail enlargement, and resolution enhancement. Moreover, after the free-form lens sheet 109 is adopted, the telephoto lens module and the wide-angle lens module have the advantage of high consistency in the details of the photographed subject in the image. Therefore, it can be better than the prior art in the effect of detail supplementation and pixel filling. Also shown in FIG. 4 is a base line 800 of the dual camera module. As shown in FIG. 4, the base line here may also be understood as a base line distance, which is a distance between the photosensitive centers of the photosensitive chips of the two camera modules.

In one embodiment, it can be seen that with the free-form lens sheet 109, in a way of dividing optical sub-regions, part of the optically functional sub-region at the telephoto end can become closer to the field of view of the wide-angle camera module, so as to provide more consistent image information of the subject and the scene. This enables the user to grasp the features that they want to emphasize. In this embodiment, the first optically functional sub-region 190 has a different optical domain and performance from the second optically functional sub-region 191. In other embodiments, the free-form lens sheet 109 may be divided into two or more optically functional sub-regions, and different optically functional sub-regions may have different designs according to different design requirements. A ratio of the angle of field of view occupied by the first optically functional sub-region 190, the second optically functional sub-region 191, . . . , and an n-th functional sub-region satisfies the following relationship.

$$FOV/S = (F_1 + F_2 + ... + F_n)/(S_1 + S_2 + S_3 + ... S_n),$$

where $F_i$ represents the field of view of an i-th optically functional sub-region, $S_i$ represents the area of the optical domain of the i-th optically functional sub-region, FOV represents a total field of view, and S represents a sum of area of the optically functional sub-regions, wherein i=1, 2, 3, . . . n.

Further, in an embodiment of the present application, the wide-angle module 10 may also have the optical alignment lens 1000.

Furthermore, in an embodiment of the present application, the wide-angle module 10 may have the optical alignment lens 1000, and the optical alignment lens 1000 has at least one free-form lens sheet 109. In other words, in the optical alignment lens 1000, at least one of the at least one first lens sheet 102 and the at least one second lens sheet 202 has at least one free-form lens sheet 109. The free-form lens sheet 109 is provided in the wide-angle module, which can effectively reduce the distortion.

Further, in the above-mentioned embodiment, the angle of field of view of the wide-angle lens module may be, for example, 60°-180°. The angle of field of view of the telephoto lens module may be, for example, 4°-60°.

According to an embodiment of the present application, there is further provided an assembly method for camera module array. A base line in an image processing algorithm in this embodiment can be set according to an actual imaging center. Correspondingly, the assembly of the dual camera module can be carried out by means of image-capturing. That is, a target board is photographed by means of image-capturing, and for the base line of the two camera modules, the two camera modules are adjusted by means of, for example, tilt, shift, and rotation, and then the two camera modules are fixed together. Herein, tilt refers to a tilt adjustment in w and v directions, shift refers to a translation adjustment in x and y directions, and rotation refers to a rotation adjustment in an r direction on an adjustment plane (or a reference plane). Hereinafter, the adjustment of w, v, x, y, r directions and so on will be described in more detail in conjunction with the drawings. In this embodiment, the method of dual camera assembly includes the following steps.

Step 1, place the wide-angle lens camera module at a predetermined position and fix it with a fixing apparatus. It includes photographing the target board after image-capturing is carried out on the wide-angle lens, and adjusting the wide-angle lens camera module to the predetermined position according to the specific position information of the target board in the photographed image.

Step 2, place the telephoto lens camera module in a predetermined position, photograph the target board by means of image-capturing, and adjust the position according to the specific information of the position of the target board in the image photographed by the telephoto lens module.

Herein, the position of the telephoto lens module relative to the wide-angle lens module is adjusted to the following indicators: the base line of the telephoto lens module and the wide-angle lens module is within a preset range, and the field of view of the telephoto lens module and the wide-angle lens module has an overlapped region and the overlapped region is within a preset region range. In summary, it can be covered as the relative position of the telephoto lens module and the wide-angle lens module including tilt, shift, and rotation.

Step 3: fix the telephoto lens module and the wide-angle lens module.

They may be fixed by a support, or externally fixed by an outer frame of a terminal, or fixed by the same substrate. That is to say, the telephoto and wide-angle lens modules may be fixed by means of a common substrate or a non-common substrate. Since the free-form lens sheet 109 is provided in this embodiment, the relative height difference of the dual-camera lens module is reduced. Thus, the difference between the TTL values of the two camera modules can be reduced to a certain threshold range (in this range, photographing of the dual-camera module will not have the above-mentioned light-shielding effect), and therefore it is particularly suitable for the dual cameras with the common substrate.

In one embodiment, in the steps 1 and 2, the wide-angle module and the telephoto lens module can be replaced with each other.

The optical alignment lens of the present application will be further described below in conjunction with a series of embodiments.

Figure 7:
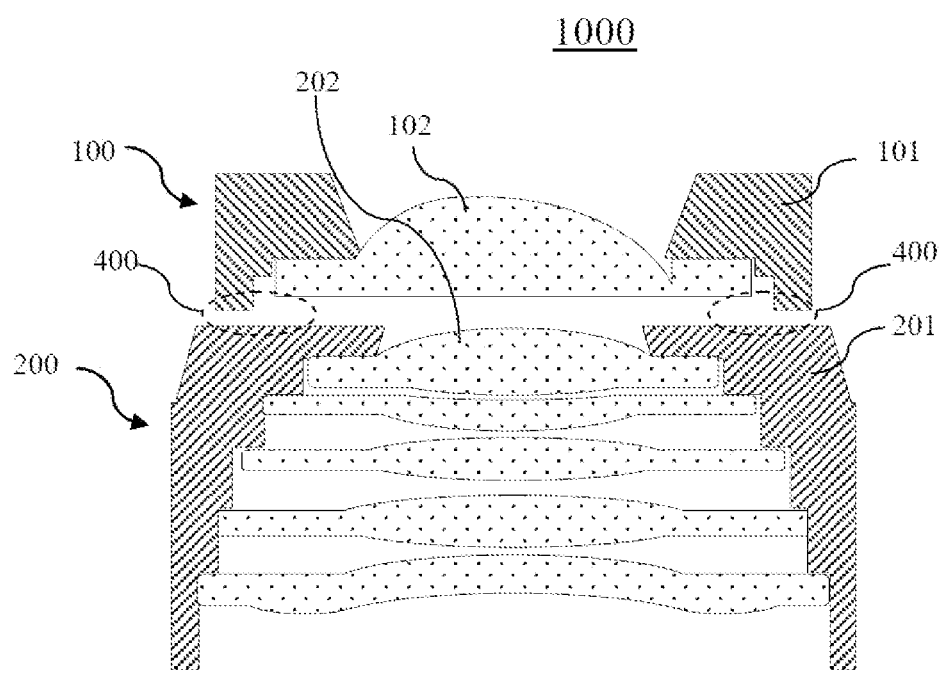
FIG. 7 shows a schematic cross-sectional view of an optical alignment lens 1000 according to an embodiment of the present application.

FIG. 7 shows a schematic cross-sectional view of an optical alignment lens 1000 according to an embodiment of the present application. The optical alignment lens 1000 includes a first lens component 100, a second lens component 200, and an adhesive (not shown in the figure) for bonding the first lens component 100 and the second lens component 200 together. The first lens component 100 includes a first lens barrel 101 and one first lens sheet 102, and the first lens sheet 102 is a free-form lens sheet. The second lens component 200 includes a second lens barrel 201 and five second lens sheets 202. The adhesive is arranged in a gap 400 between the first lens component 100 and the second lens component 200 to fix the first lens component 100 and the second lens component 200 together. In this embodiment, the adhesive supports and fixes the first lens component and the second lens component, and makes the relative position of the first lens component and the second lens component maintain at a relative position determined by active alignment.

Figure 8:
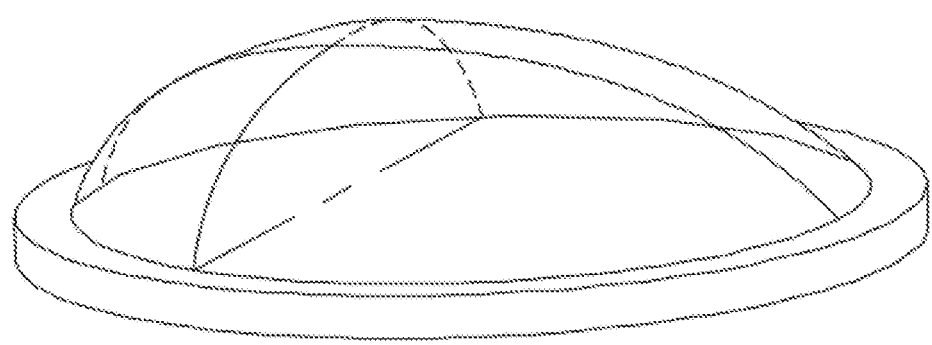
FIG. 8 shows a three-dimensional schematic view of a free-form lens sheet in an embodiment of the present application.

In this embodiment, the free-form lens sheet has a complex optical surface processed based on the free-form technology. The complex optical surface can be obtained by, for example, designing a progressive multifocal surface on a front or back surface of the lens sheet through free-form design software during optical design, and then processing it through performing steps such as fine grinding and polishing on a high-precision CNC lathe. FIG. 8 shows a three-dimensional schematic view of a free-form lens sheet in an embodiment of the present application. Referring to FIG. 8, it can be seen that the free-form surface is a complex aspheric surface, which is irregular and asymmetric in most cases. For the free-form lens sheet, it has a strong directivity on a plane perpendicular to its thickness direction. In this embodiment, the relative positional relationship between the first lens component 100 and the second lens component 200 can be adjusted during the active alignment phase, to make a difference between an actual reference direction of the free-form lens sheet and a reference direction determined by an optical design not greater than 0.05 degrees (wherein the reference direction is used to characterize surface profile direction information of the free-form lens sheet). Then, the first lens component 100 and the second lens component 200 are supported and fixed by using the adhesive located in the gap 400, so that the relative position of the first lens component 100 and the second lens component 200 maintains at the relative position determined by the active alignment, thereby ensuring the imaging quality of the optical alignment lens.

In contrast, in the traditional optical alignment lens assembly process, a plurality of lenses are assembled in the same lens barrel. Moreover, the non-rotationally symmetric free-form lens sheet does not have an inherent property of optical axis symmetry, that is, it cannot rely on the optical axis of the lens sheet to perform assembly operations such as positioning and adjustment, resulting in extremely difficult assembly, especially for the rotational positioning of the free-form lens sheet in the lens barrel in the traditional technology. In other words, the free-form lens sheet is highly sensitive to assembly errors, especially rotation errors. If an optical alignment lens or camera module including the free-form lens sheet is assembled based on the traditional technology, the free-form lens sheet is prone to undesired rotation or inaccurate positioning in the rotation direction in the lens barrel, resulting in the problems such as substandard product imaging quality or even failure of imaging.

Figure 9:
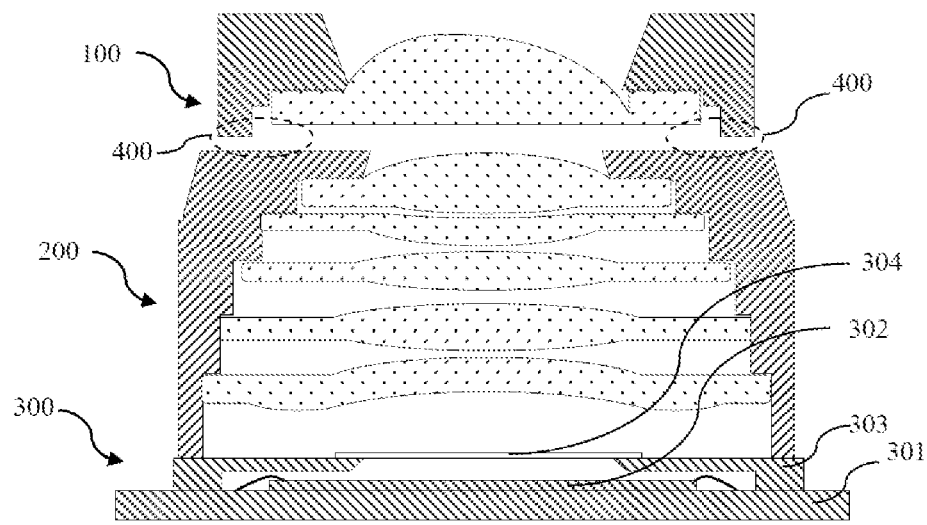
FIG. 9 shows a schematic cross-sectional view of a camera module 2000 according to an embodiment of the present application.

Further, FIG. 9 shows a schematic cross-sectional view of a camera module 2000 according to an embodiment of the present application. The camera module 2000 includes the optical alignment lens 1000 as shown in FIG. 7 and a photosensitive assembly 300. The photosensitive assembly 300 includes a circuit board 301, a photosensitive chip 302 mounted on the circuit board 301, a cylindrical support 303 mounted on the circuit board 301 and surrounding the photosensitive chip, and a color filter 304 mounted on the cylindrical support 303. Further, the second lens component 200 may further include a motor, and the second lens barrel 202 may be mounted in a carrier of the motor. The motor is mounted on a top surface of the cylindrical support 303 so as to fix the second lens component 200 and the photosensitive assembly 300 together. It needs to be noted that in other embodiments of the present application, the motor may also be replaced by another structure such as a cylindrical support, or the motor may also be cancelled and the second lens barrel 201 is directly mounted on the top surface of the cylindrical support 303. It needs to be noted that in other embodiments, the motor may also be replaced by another type of optical actuator, such as an SMA (shape memory alloy) actuator, an MEMS actuator or the like. The optical actuator refers to a device used to urge the optical alignment lens to move relative to the photosensitive chip.

In the above-mentioned embodiments, the distortion can be reduced by applying the free-form lens sheet to an optical alignment lens with a small size and large aperture, and the distortion can be reduced by applying free-form lens sheet to a camera module with high pixels, a small size and large aperture; the total optical length of the camera module can be reduced, thereby reducing the volume of the camera module; and product defects caused by undesired rotation of the free-form lens sheet or inaccurate positioning of the rotation direction in the lens barrel during assembly can be effectively avoided.

Further, in an embodiment, the size of the gap 400 in the direction along the optical axis of the optical alignment lens is, for example, 30-100 μm.

Figure 10:
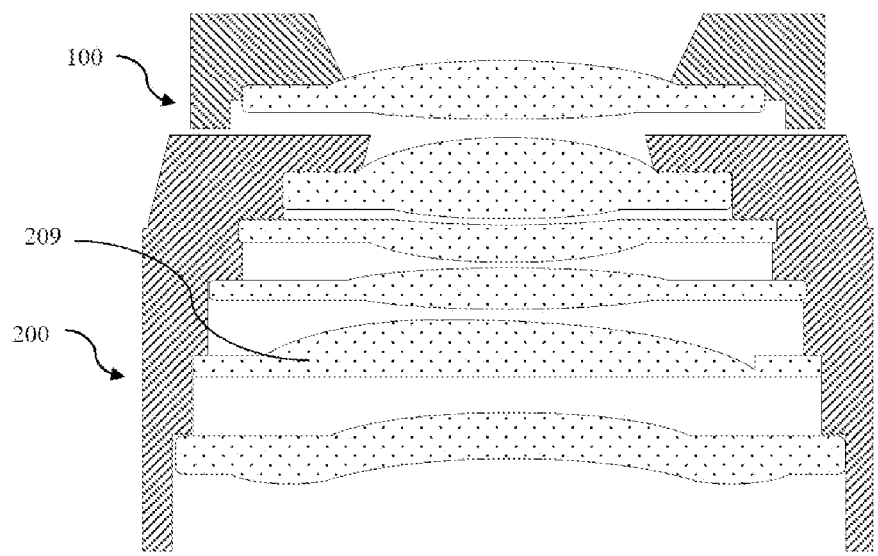
FIG. 10 shows a schematic cross-sectional view of an optical alignment lens 1000a according to another embodiment of the present application.
Figure 11:
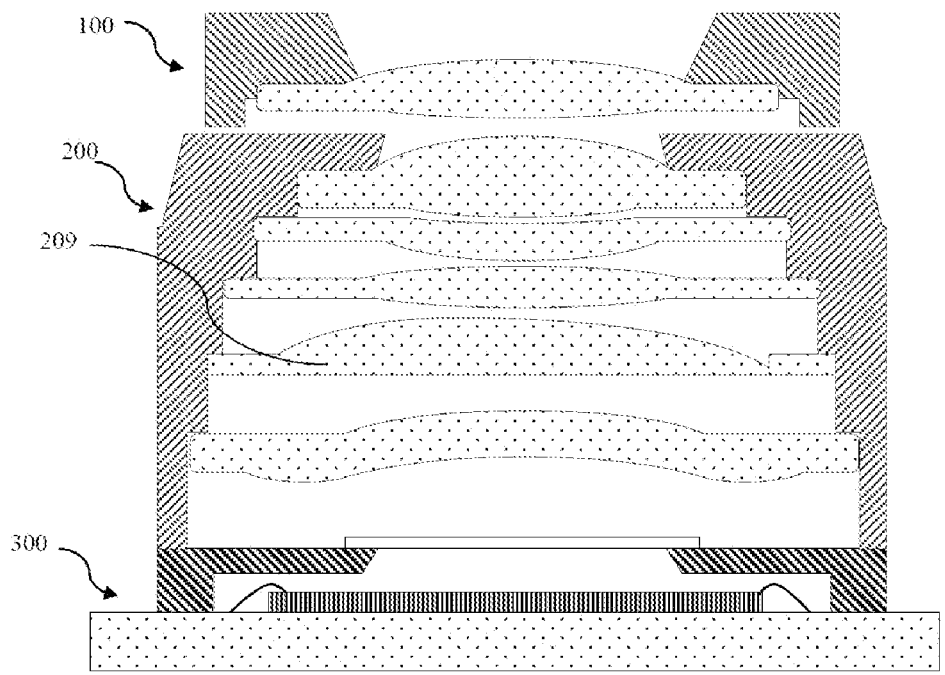
FIG. 11 shows a schematic cross-sectional view of a photosensitive assembly 2000a based on the optical alignment lens 1000a of FIG. 10.

Further, FIG. 10 shows a schematic cross-sectional view of an optical alignment lens 1000a according to another embodiment of the present application. As shown in FIG. 10, the difference between this embodiment and the optical alignment lens 1000 shown in FIG. 7 is that the second lens component 200 has a free-form lens sheet 109. The first lens sheet of the first lens component 100 adopts a conventional lens sheet. Further, FIG. 11 shows a schematic cross-sectional view of a photosensitive assembly 2000a based on the optical alignment lens 1000a of FIG. 10.

Figure 12:
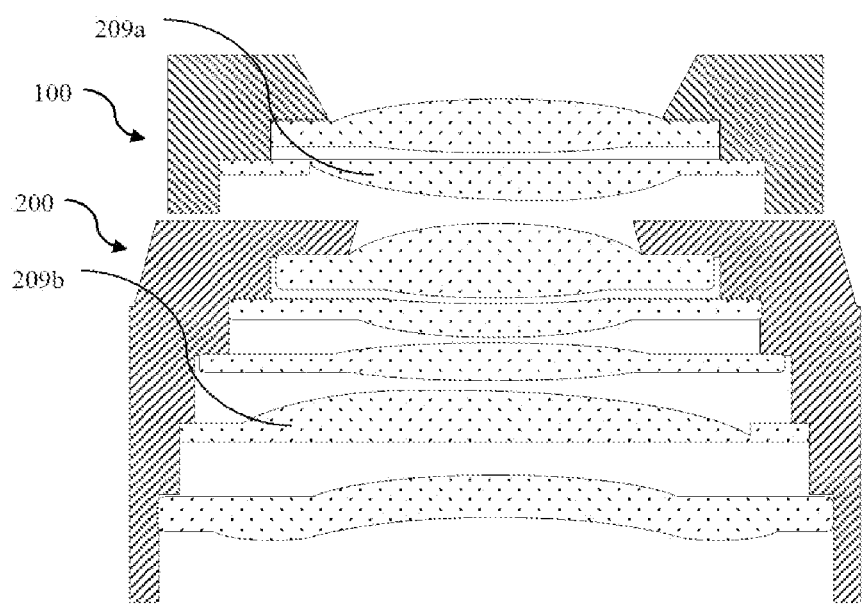
FIG. 12 shows a schematic cross-sectional view of an optical alignment lens 1000b according to another embodiment of the present application.
Figure 13:
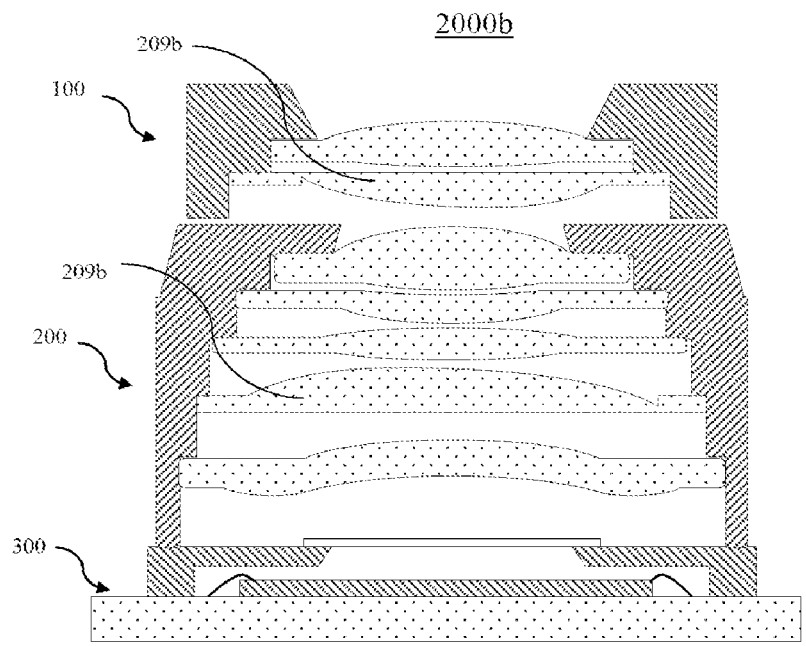
FIG. 13 shows a schematic cross-sectional view of a photosensitive assembly 2000b based on the optical alignment lens 1000b of FIG. 12.

Further, FIG. 12 shows a schematic cross-sectional view of an optical alignment lens 1000b according to another embodiment of the present application. As shown in FIG. 12, the difference between this embodiment and the optical alignment lens 1000 shown in FIG. 7 is that the first lens component 100 and the second lens component 200 have free-form lens sheets 109a and 109b, respectively. In this design, during the active alignment stage, the relative position of the first lens component 100 and the second lens component 200 can be adjusted to make the free-form lens sheets 109a and 109b complementary to each other, so as to better adjust the actual imaging quality of the optical system. Further, FIG. 13 shows a schematic cross-sectional view of a photosensitive assembly 2000b based on the optical alignment lens 1000b of FIG. 12. Since the relative position of the first lens component 100 and the second lens component 200 can be adjusted during the active alignment stage to make the free-form lens sheets 109a and 109b complementary to each other, the camera module 2000b can have better imaging quality.

It needs to be noted that in the above embodiment, the number of lens sheets of the first lens component and the second lens component can be adjusted as needed. For example, the number of lens sheets of the first lens component and the second lens component may be two and four, respectively, or may be three and three, respectively, or may be four and two, respectively, or may be five and one, respectively. The total number of lens sheets of the entire optical alignment lens can also be adjusted as needed. For example, the total number of lens sheets of the optical alignment lens may be six, or may be five or seven.

It also needs to be noted that in the optical alignment lens of the present application, the lens components are not limited to two. For example, the number of lens components may also be a number of greater than two, such as three or four. When there are more than two lens components constituting the optical alignment lens, two adjacent lens components may be regarded as the aforementioned first lens component and the aforementioned second lens component, respectively. For example, when the number of lens components of the optical alignment lens is three, the optical alignment lens may include two first lens components and one second lens component located between the two first lens components, and all first lens sheets of the two first lens components and all second lens sheets of the one second lens component together constitute an imageable optical system for active alignment. When the number of lens components of the optical alignment lens is four, the optical alignment lens may include two first lens components and two second lens components, and they are arranged from top to bottom in an order of a first lens component, a second lens component, a first lens component, and a second lens component, and all first lens sheets of the two first lens components and all second lens sheets of the two second lens components together constitute an imageable optical system for active alignment. Other variations like this will not be repeated one by one herein.

Figure 14:
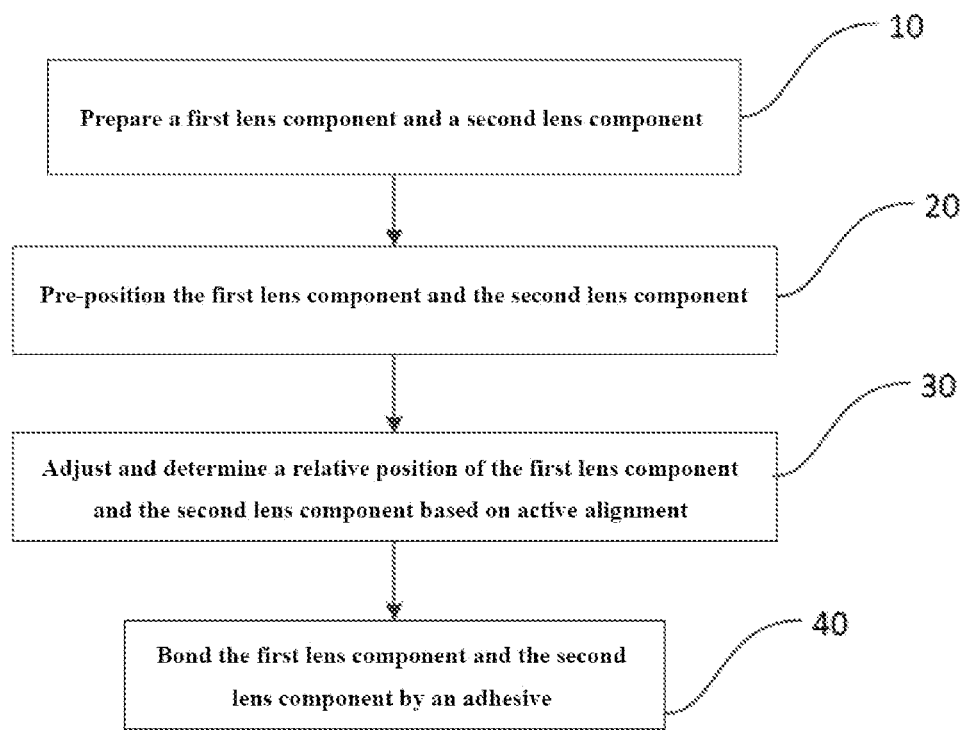
FIG. 14 shows a flowchart of an optical alignment lens assembly method in an embodiment of the present disclosure.

Further, FIG. 14 shows a flowchart of an optical alignment lens assembly method in an embodiment of the present application. Referring to FIG. 14, the method comprises:

Step 10, prepare a first lens component and a second lens component separated from each other, wherein the first lens component includes a first lens barrel and at least one first lens sheet mounted in the first lens barrel, and the second lens component includes a second lens barrel and at least one second lens sheet mounted in the second lens barrel. There is at least one free-form lens sheet among the first lens sheet(s) and the second lens sheet(s).

Step 20, pre-position the first lens component and the second lens component, so that the at least one second lens sheet and the at least one first lens sheet together constitute an imageable optical system.

Step 30, adjust and determine a relative position of the first lens component and the second lens component based on active alignment.

Step 40, bond the first lens component and the second lens component by an adhesive. In this step, the cured adhesive is used to support and fix the first lens component and the second lens component, so that the relative position of the first lens component and the second lens component is maintained at a relative position determined by the active alignment.

Further, in an embodiment, before step 30 is performed, the adhesive may be applied in a gap between the first lens component and the second lens component, and then step 30 is performed to adjust and determine the relative position of the first lens component and the second lens component. After determining the relative position, step 40 is performed to cure the adhesive, so that the cured adhesive is used to support the first lens component and the second lens component, and thus the relative position of the first lens component and the second lens component is maintained at the relative position determined by the active alignment. However, in another embodiment, step 30 may be performed first so as to adjust and determine the relative position of the first lens component and the second lens component. After determining the relative position, the first lens component (or second lens component) is temporarily moved away, then the adhesive is applied, and thereafter, the first lens component (or second lens component) is moved back based on the determined relative position. Finally, the adhesive is cured so that the relative position of the first lens component and the second lens component is maintained at the relative position determined by the active alignment.

Figure 15A:
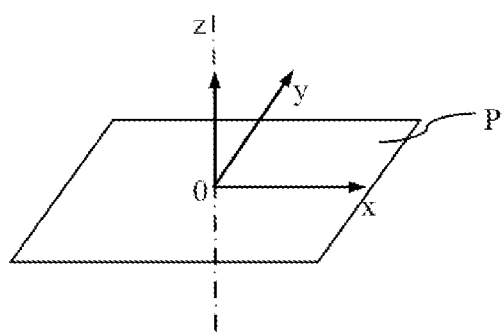
FIG. 15a shows a relative position adjustment manner in active alignment in an embodiment of the present application.

Further, the active alignment described in the present application can adjust the relative position of the first lens component and the second lens component in multiple degrees of freedom. FIG. 15a shows a relative position adjustment manner in the active alignment in an embodiment of the present application. In this adjustment manner, the first lens component (or the first lens sheet) can be moved along x, y, and z directions relative to the second lens component (that is, the relative position adjustment in this embodiment has three degrees of freedom). The z direction is a direction along the optical axis, and the x and y directions are directions perpendicular to the optical axis. The x and y directions are both in an adjustment plane P, and each translation in the adjustment plane P can be decomposed into two components in the x and y directions.

Figure 15B:
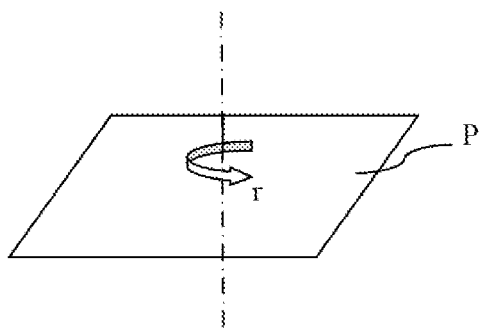
FIG. 15b shows rotation adjustment in the active alignment according to another embodiment of the present application.

FIG. 15b shows rotation adjustment in the active alignment according to another embodiment of the present application. In this embodiment, in addition to the three degrees of freedom in FIG. 15a, a degree of freedom in rotation is, i.e., an adjustment in an r direction, is also added to the relative position adjustment. In this embodiment, the adjustment in the r direction is rotation in the adjustment plane P, namely, rotation around an axis perpendicular to the adjustment plane P.

Figure 15C:
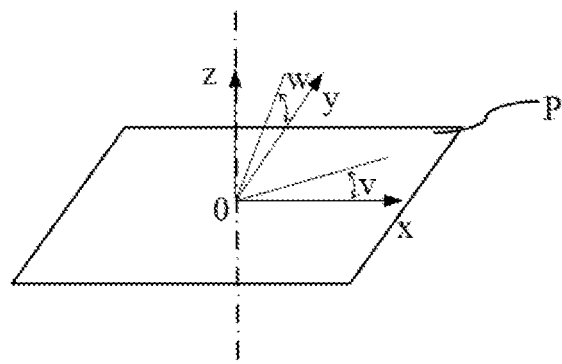
FIG. 15c shows a relative position adjustment manner in which adjustments in v and w directions are added in the active alignment according to further another embodiment of the present application.

Further, FIG. 15c shows a relative position adjustment manner in which adjustments in v and w directions are added in the active alignment according to further another embodiment of the present application. The v direction represents a rotation angle of an xoz plane, and the w direction represents a rotation angle of a yoz plane. The rotation angles of the v direction and the w direction can be combined into a vector angle, which represents a total tilt state. That is to say, by adjusting in the v and w directions, the tilt attitude of the first lens component relative to the second lens component (i.e. tilt of an optical axis of the first lens component relative to an optical axis of the second lens component) can be adjusted.

The adjustments in the six degrees of freedom of x, y, z, r, v, and w may all affect the imaging quality of the optical system (for example, affecting the size of the resolution). In other embodiments of the present application, the relative position adjustment manner may be to adjust only in any one of the above-mentioned six degrees of freedom, or may be a combination of any two or more of them.

In particular, in an embodiment, the active alignment includes at least calibration/alignment in the r direction. Specifically, the active alignment step (step 30) includes: according to a measured resolution of the optical system (in the present application, the resolution can be obtained from a measured MTF curve or SFR curve, but the method of obtaining the resolution is not limited to this), adjusting and determining the relative positional relationship of the first lens component and the second lens component by clamping or adsorbing the first lens component and/or the second lens component. The first lens component is moved along an adjustment plane, and according to the measured resolution of the optical system, the relative position between the first lens component and the second lens component in a direction of movement along the plane is determined, wherein the movement comprises rotation in the adjustment plane, namely, movement in the r direction. In this embodiment, the first lens component and/or the second lens component have/has an identification characterizing surface profile direction information of the free-form surface lens sheet included therein.

In an embodiment, the free-form surface lens sheet has a reference plane perpendicular to its thickness direction, the free-form surface lens sheet has a reference direction in the reference plane, and the first lens component and/or the second lens component have/has an identification of the reference direction to characterize the surface profile direction information of the free-form surface lens sheet. The free-form lens sheet is very sensitive to the rotational positioning in the reference plane, and in the active alignment stage, the relative movement and adjustment of the first lens component and the second lens component along the r direction can improve the mounting accuracy of the actual reference direction of the free-form lens sheet. For example, a difference between an actual reference direction of the free-form lens sheet and a reference direction determined by an optical design can be not greater than 0.05 degrees, thereby obtaining a small-size and large-aperture optical lens or camera module with high imaging quality. In this embodiment, when the free-form lens sheet performs rotation correction relative to other lenses, aberration adjustment data can be collected and obtained in real time and corrected, so that the lens and/or camera module with the free-form lens sheet can finally obtain a better imaging effect. Through adjustment, the optical system composed of two lens components has better imaging performance. For example, the surrounding distortion of imaging is small, and the aberration of the optical system is small. The adjustment indicator of active alignment can be set for different needs. As a result, the actively calibrated optical lenses with different adjustment indicators meet different optical performances.

On the other hand, in the pre-positioning stage, the identification of the reference direction can help the free-form lens sheet quickly pre-position to the direction determined by the optical design, and then active adjustment/alignment is performed on the basis of the pre-positioning. This will help improve the production efficiency of optical lenses or camera modules. In another embodiment, machine recognition can also be performed on the surface profile direction of the free-form lens sheet based on the machine vision technology, and pre-positioning of the r-direction is performed based on the recognition result, and then active adjustment/alignment is performed on the basis of the pre-positioning.

Further, in an embodiment, in the active alignment step, the movement further includes a translation in the adjustment plane, namely, the movement in the x and y directions.

Further, in an embodiment, the active alignment further comprises: according to the measured resolution of the optical system, adjusting and determining an included angle between the axis of the first lens component and the axis of the second lens component namely, the adjustment in the w and v directions. In the assembled optical lens or camera module, there may be a non-zero included angle between the axis of the first lens component and the axis of the second lens component.

Further, in an embodiment, the active alignment further comprises: moving the first lens component in a direction perpendicular to the adjustment plane (i.e. adjustment in the z direction), and according to the measured resolution of the optical system, determining the relative position between the first lens component and the second lens component in the direction perpendicular to the adjustment plane.

Further, in an embodiment, in the pre-positioning step (step 20), there is a gap between a bottom surface of the first lens component and a top surface of the second lens component; and in the bonding step (step 40), the adhesive is arranged in the gap.

Further, in an embodiment, in the preparation step (step 10), the first lens component may not have a first lens barrel. For example, the first lens component may be composed of a single first lens sheet. In the pre-positioning step (step 20), there is a gap between a bottom surface of the first lens sheet and the top surface of the second lens component; and in the bonding step (step 40), the adhesive is arranged in the gap. In this embodiment, the first lens sheet may be formed by a plurality of sub-lens sheets that are fitted with each other to form one body. In this embodiment, a side surface and a top surface of non-optical surfaces of the first lens sheet that are not used for imaging may form a light-shielding layer. The light-shielding layer may be formed by screen printing a light-shielding material on the side surface and the top surface of the first lens sheet.

In an embodiment, in the active alignment step, the second lens component can be fixed, the first lens component can be clamped by a clamper, and the first lens component can be moved under the drive of a six-axis motion mechanism connected with the clamper, thereby realizing the above-mentioned relative movement of six degrees of freedom between the first lens component and the second lens component. The clamper can bear against or partially bear against the side surface of the first lens component, thereby clamping the first lens component.

Further, according to an embodiment of the present application, there is further provided a camera module assembly method, comprising: assembling an optical alignment lens by using the optical alignment lens assembly method of any one of the aforementioned embodiments, and then manufacturing a camera module by using the assembled optical alignment lens.

Further, according to another embodiment of the present application, there is further provided a flowchart of another camera module assembly method, the method comprising:

Step 100, prepare a first lens component and a camera module component, wherein the camera module component includes a second lens component and a photosensitive module combined together, the first lens component includes a first lens barrel and at least one first lens sheet mounted in the first lens barrel, and the second lens component includes a second lens barrel and at least one second lens sheet mounted in the second lens barrel. Moreover, there is at least one free-form lens sheet among the first lens sheet(s) and the second lens sheet(s).

Step 200, pre-position the first lens component and the second lens component, so that the at least one second lens sheet and the at least one first lens sheet together constitute an imageable optical system.

Step 300, adjust and determine a relative position of the first lens component and the second lens component based on active alignment.

Step 400, bond the first lens component and the second lens component by an adhesive.

It can be seen that, compared with the previous embodiment, the second lens component and the photosensitive module in this embodiment are first assembled together to constitute a camera module component, and then the camera module component and the first lens component are assembled to obtain a complete camera module. The process of assembling the camera module component and the first lens component can also have many variants. For example, the aforementioned multiple embodiments of the optical alignment lens assembly method may be referred to so as to realize the assembly of the camera module component and the first lens component.

In the foregoing embodiment, the dual cameras composed of wide-angle and telephoto lenses are only one of various common dual-camera schemes. In general, the dual cameras can have two types: "symmetrical" and "asymmetrical". The "symmetrical" dual-camera module can mean that the two camera modules have roughly the same size, for example, the "color+black and white" dual-camera scheme, in which the two cameras have the same focal length and the consistent sizes, and sometimes even the pixel sizes of the photosensitive chips of the two camera modules are also the same. The dual cameras have improved image quality. The "asymmetric" dual-camera module usually means that the two camera modules have inconsistent sizes, which may mean that the focal lengths of the cameras are not the same, for example, taking iPhone 7 Plus and LG G5 as examples. The two modules of the dual cameras can have a difference between a main camera and a secondary camera. This difference can bring many functions to the dual-camera module. The main camera is a camera that has been working for a long time when the camera module array is working. The secondary camera can be used to record depth of field information for auxiliary photographing. The "asymmetrical" dual-camera module has different design schemes such as "telephoto+wide angle" and "telephoto+standard". Taking iPhone 7 Plus as an example, the wide-angle camera module serves as the main camera and the main camera will take the overall picture when photographing. The free-form lens sheet can be used in any one of the above-mentioned dual-camera modules (or multi-camera modules including the above-mentioned dual cameras) to reduce the total optical length. In particular, for the "asymmetrical" dual-camera modules, one of the camera modules can reduce its own total optical length through the free-form lens sheet, so that the total optical lengths of the two camera modules are equal or the difference between the total optical lengths of the two is smaller than a threshold.

The dual-camera logic on the market includes: depth of field dual cameras, black and white+color dual cameras and dual-fixed focus dual cameras. In these types of dual cameras, the total optical length may be reduced by using the free-form lens sheet. By replacing ordinary lens sheets with the free-form lens sheet, the size of the camera module (referring to the camera module including the free-form lens sheet) in the camera module array can be reduced, thereby reducing the overall size of the camera module array.

The above description is only the preferred implementations of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form various technical solutions.

The invention claimed is:

1. A camera module array, comprising at least two camera modules, wherein the at least two camera modules comprise a wide-angle module and a telephoto module, and wherein the telephoto module has a free-form lens sheet, and the total track length of the telephoto module is reduced through the free-form lens sheet, so that total track lengths of the wide-angle module and the telephoto module are equal or a difference between the total track lengths of the two is smaller than a preset threshold;

wherein the telephoto module comprises an optical alignment lens, wherein the free-form lens sheet is mounted in the optical alignment lens, and the optical alignment lens comprises:
a first lens component comprising at least one first lens sheet;
a second lens component comprising a second lens barrel and at least one second lens sheet mounted in the second lens barrel, the at least one first lens sheet and the at least one second lens sheet together constituting an imageable optical system; and
a connecting medium adapted to fix the first lens component and the second lens component together; and
at least one of the at least one first lens sheet and the at least one second lens sheet has at least one free-form lens sheet.

2. The camera module array according to claim 1, wherein photographing regions of the wide-angle module and the telephoto module have overlap.

3. The camera module array according to claim 2, wherein frontal end surfaces of a wide-angle lens of the wide-angle module and a telephoto lens of the telephoto module are flush with each other.

4. The camera module array according to claim 3, wherein the wide-angle module and the telephoto module share the same circuit board.

5. The camera module array according to claim 4, wherein the camera module array is reinforced by a support, so that the wide-angle module and the telephoto module are more stably fixed together.

6. The camera module array according to claim 2, wherein the wide-angle module and the telephoto module do not share the same circuit board, and wherein the wide-angle module and the telephoto module are fixed by a support, and the heights of light incident surfaces of the two camera modules are the same.

7. The camera module array according to claim 1, wherein the free-form lens sheet has a plurality of functional regions, and the plurality of functional regions have different curvatures.

8. The camera module array according to claim 7, wherein the plurality of functional regions comprises a first optically functional sub-region and a second optically functional sub-region, wherein the first optically functional sub-region and the second optically functional sub-region correspond to different depth-of-field intervals, so that the telephoto module can obtain clear images of objects in different depth-of-field intervals at the same time.

9. The camera module array according to claim 1, wherein the at least two camera modules comprise a black and white module and a color module.

10. The camera module array according to claim 1, wherein the wide-angle camera module has at least one free-form lens sheet to reduce photographing distortion of the wide-angle camera module.

11. The camera module array according to claim 1, wherein the connecting medium is an adhesive, which is adapted to support and fix the first lens component and the second lens component, and make a relative position of the first lens component and the second lens component maintain at a relative position determined by active alignment.

12. The camera module array according to claim 1, wherein there is a non-zero included angle between an axis of the first lens component and an axis of the second lens component; and in an optical axis direction of the optical lens, there is a gap between the first lens component and the second lens component.

13. The camera module array according to claim 1, wherein the number of the first lens sheet is one, and the first lens sheet is a free-form lens sheet.

14. The camera module array according to claim 1, wherein the number of the at least one second lens sheet is more than one, and the at least one second lens sheet has one free-form lens sheet.

15. The camera module array according to claim 1, wherein the first lens component and/or the second lens component have/has an identification characterizing surface profile direction information of the free-form lens sheet included therein.

16. The camera module array according to claim 15, wherein the free-form lens sheet has a reference plane perpendicular to its thickness direction, the free-form lens sheet has a reference direction in the reference plane, and the first lens component and/or the second lens component have/has an identification of the reference direction to characterize the surface profile direction information of the free-form lens sheet.

17. A camera module array, comprising at least two camera modules, wherein the at least two camera modules comprise two asymmetric camera modules, and at least one of the two asymmetric camera modules has a free-form lens sheet, so that total track lengths of the two asymmetric camera modules are equal or a difference between the total track lengths of the two is smaller than a preset threshold; wherein the at least one of the two asymmetric camera modules having the free-form lens sheet comprises an optical alignment lens, wherein the free-form lens sheet is mounted in the optical alignment lens, and the optical alignment lens comprises:
a first lens component comprising at least one first lens sheet;
a second lens component comprising a second lens barrel and at least one second lens sheet mounted in the second lens barrel, the at least one first lens sheet and the at least one second lens sheet together constituting an imageable optical system; and
a connecting medium adapted to fix the first lens component and the second lens component together; and
at least one of the at least one first lens sheet and the at least one second lens sheet has at least one free-form lens sheet.

18. The camera module array according to claim 17, wherein frontal end surfaces of the two asymmetric camera modules are flush with each other.

19. An assembly method for camera module array, comprising:
assembling a wide-angle module and a telephoto module; and
fixing the wide-angle module and the telephoto module together to form a camera module array, so that an included angle between the wide-angle module and the telephoto module is within an included angle threshold, and a distance between the wide-angle module and the telephoto module is within a distance threshold;
wherein the telephoto module has a free-form lens sheet, and the total track length of the telephoto module is reduced through the free-form lens sheet, so that total track lengths of the wide-angle module and the telephoto module are equal or a difference between the total track lengths of the two is smaller than a preset threshold;
wherein the telephoto module comprises an optical alignment lens, wherein the free-form lens sheet is mounted in the optical alignment lens, and the optical alignment lens comprises:
a first lens component comprising at least one first lens sheet;
a second lens component comprising a second lens barrel and at least one second lens sheet mounted in the second lens barrel, the at least one first lens sheet and the at least one second lens sheet together constituting an imageable optical system; and
a connecting medium adapted to fix the first lens component and the second lens component together; and
at least one of the at least one first lens sheet and the at least one second lens sheet has at least one free-form lens sheet.

* * * * *